US011578985B2

(12) United States Patent
Nakamura et al.

(10) Patent No.: US 11,578,985 B2
(45) Date of Patent: Feb. 14, 2023

(54) INFORMATION PROCESSING APPARATUS, INFORMATION PROCESSING METHOD AND NON-TRANSITORY MEMORY MEDIUM

(71) Applicant: TOYOTA JIDOSHA KABUSHIKI KAISHA, Toyota (JP)

(72) Inventors: Taiki Nakamura, Nagoya (JP); Jin Xin, Nagoya (JP); Ai Yashiro, Nagoya (JP); Toshinori Takayama, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 124 days.

(21) Appl. No.: 17/115,959

(22) Filed: Dec. 9, 2020

(65) Prior Publication Data

US 2021/0180971 A1 Jun. 17, 2021

(30) Foreign Application Priority Data

Dec. 12, 2019 (JP) .............................. JP2019-224659

(51) Int. Cl.
*G01C 21/34* (2006.01)
(52) U.S. Cl.
CPC ................................ *G01C 21/3484* (2013.01)
(58) Field of Classification Search
CPC ........................ G01C 21/3484; G06Q 10/047
See application file for complete search history.

(56) References Cited

U.S. PATENT DOCUMENTS

2006/0053110 A1\* 3/2006 McDonald ............. G06Q 30/02
2008/0010006 A1\* 1/2008 Schwarzmann ....... G01C 21/00
340/995.19

FOREIGN PATENT DOCUMENTS

| JP | 08-271275 A | 10/1996 |
| JP | 2008-281488 A | 11/2008 |
| JP | 2010-101826 A | 5/2010 |
| WO | 2009/053792 A2 | 4/2009 |

\* cited by examiner

*Primary Examiner* — Rami Khatib
(74) *Attorney, Agent, or Firm* — Sughrue Mion, PLLC

(57) ABSTRACT

An information processing apparatus acquires a route score including a travel cost and a coefficient for each of a plurality of driving route candidates. The information processing apparatus acquires a user score including an individual rate that is a time-cost conversion rate particular to a mobile user and a weight application rate particular to the mobile user. Based on the respective route scores of the plurality of driving route candidates and the user score of the mobile user, the information processing apparatus converts the travel cost of each of the plurality of driving route candidates into a corresponding cost that is a cost obtained by reflection of the time-cost conversion rate and the weight application rate of the mobile user in the travel cost. The information processing apparatus determines a recommendation order of the plurality of driving route candidates based on the corresponding costs of the plurality of driving route candidates.

16 Claims, 6 Drawing Sheets

[Fig. 1]
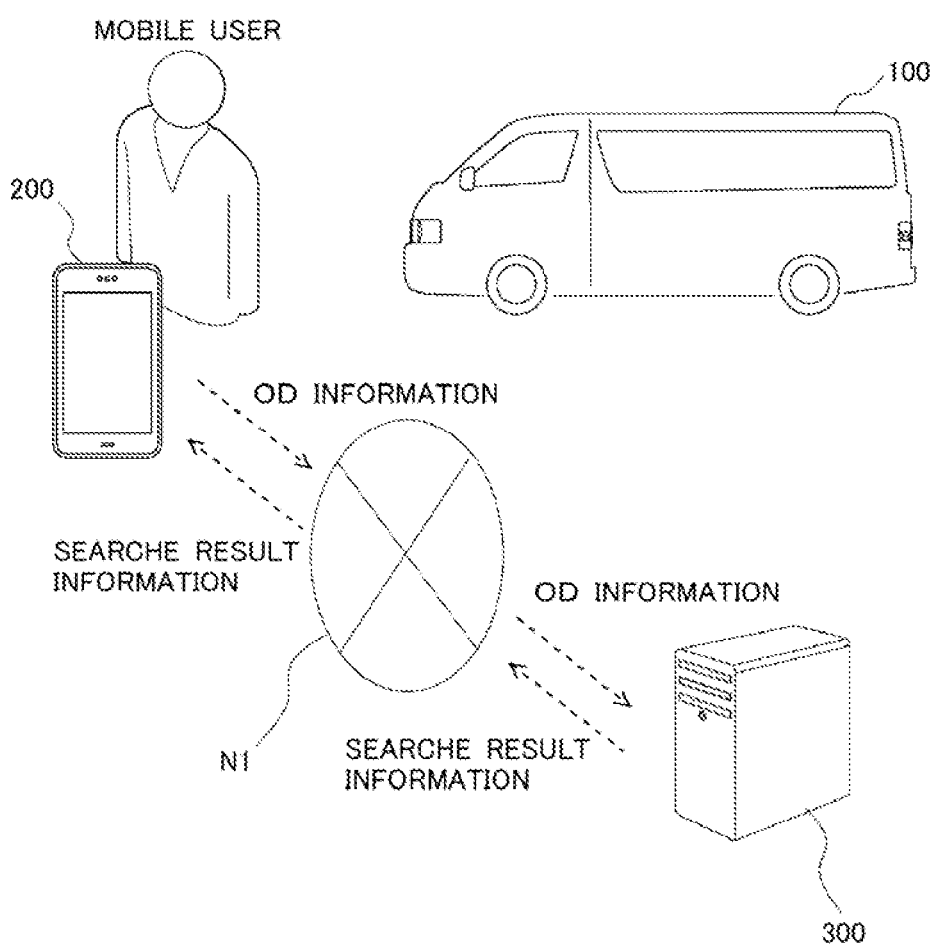

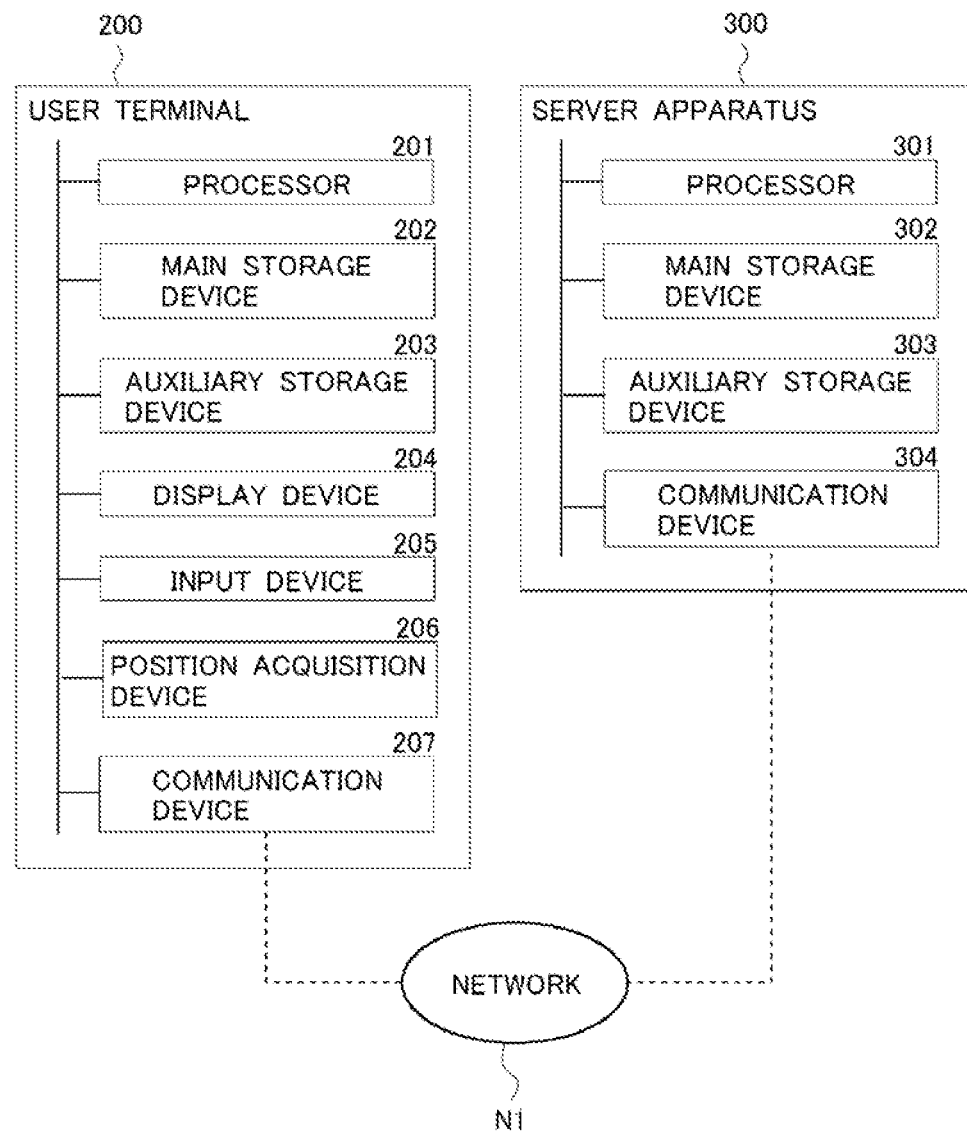

[Fig. 3]
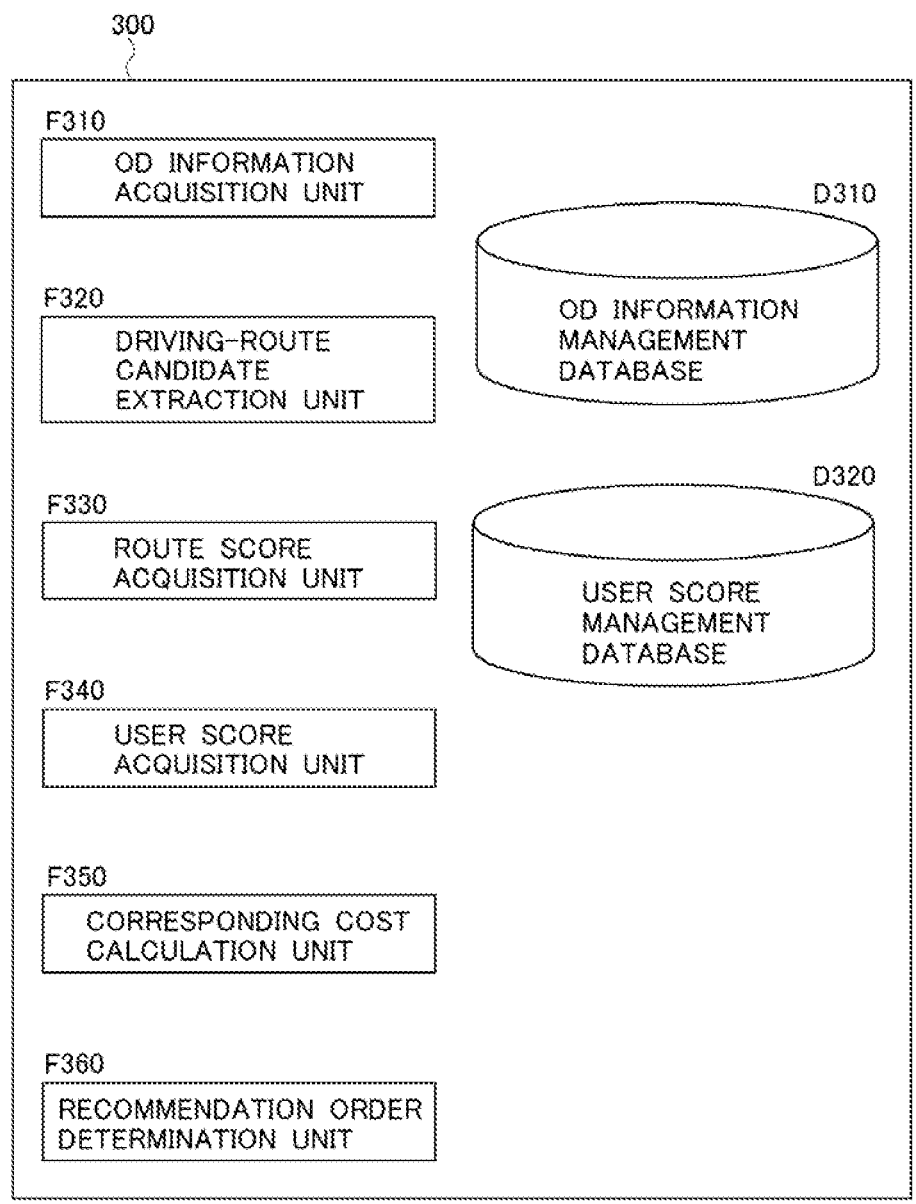

[Fig. 4]

| OD-ID | OD INFORMATION | ROUTE ID | ROUTE INFORMATION | TOLL FEE | REQUIRED TIME | TRAVEL COST | WEIGHT COEFFICIENT |
|---|---|---|---|---|---|---|---|
| 0001 | ---- | R1001 | ---- | ---- | ---- | ---- | ---- |
|  |  | R1002 | ---- | ---- | ---- | ---- | ---- |
| 0002 | ---- | R2001 | ---- | ---- | ---- | ---- | ---- |
|  |  | R2002 | ---- | ---- | ---- | ---- | ---- |
| ⋮ | ⋮ | ⋮ | ⋮ | ⋮ | ⋮ | ⋮ | ⋮ |

[Fig. 5]

| USER ID | TIME-COST CONVERSION RATE | WEIGHT APPLICATION RATE |
|---|---|---|
| U0001 | ---- | ---- |
| U0002 | ---- | ---- |
| ⋮ | ⋮ | ⋮ |

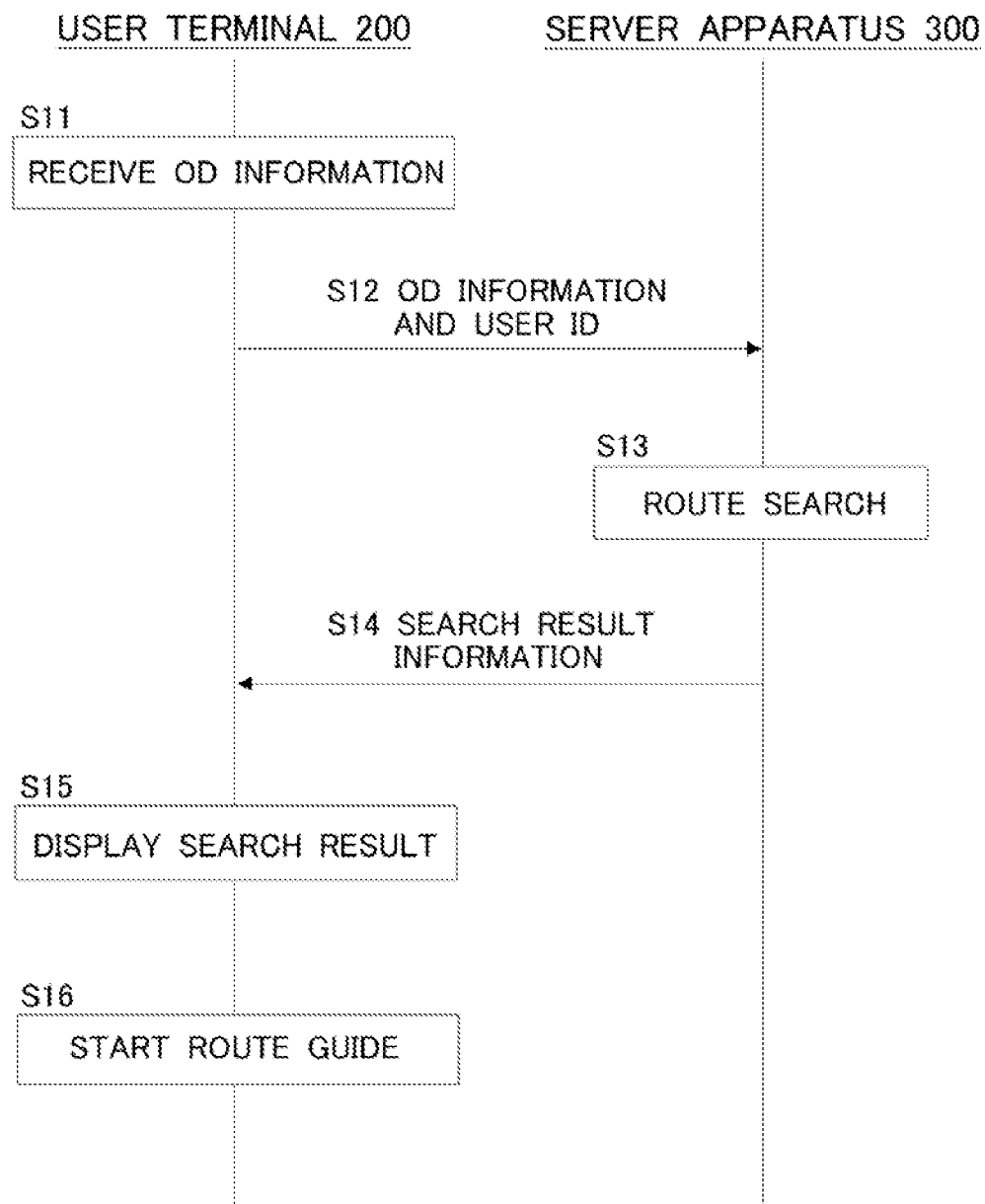

[Fig. 7]
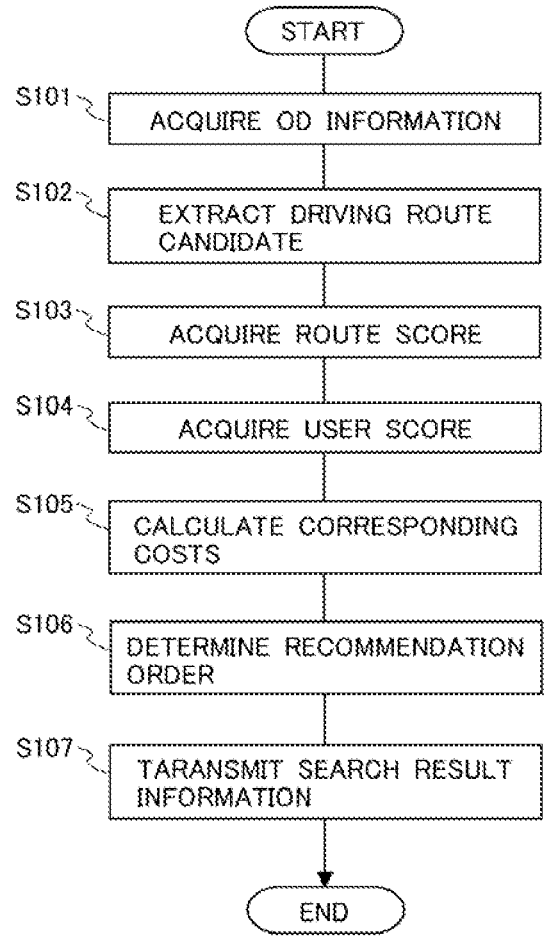
[Fig. 8]
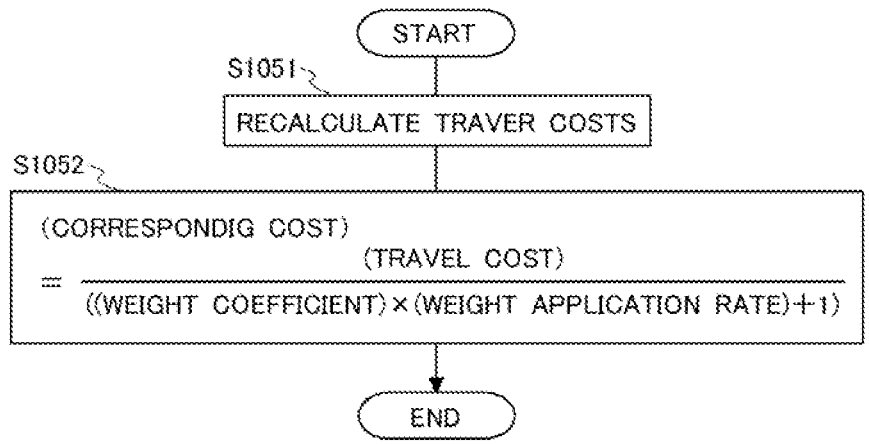

INFORMATION PROCESSING APPARATUS, INFORMATION PROCESSING METHOD AND NON-TRANSITORY MEMORY MEDIUM

CROSS REFERENCE TO RELATED APPLICATIONS

This application claims the benefit of Japanese Patent Application No. 2019-224659, filed on Dec. 12, 2019, which is hereby incorporated by reference herein in its entirety.

BACKGROUND

Technical Field

The present disclosure relates to an information processing apparatus, an information processing method and a non-transitory memory medium.

Description of the Related Art

As a technique for searching for a driving route for a vehicle, a technique that learns a parameter that a user of a vehicle is presumed to emphasize from among a distance from an origin to a destination, a fee necessary for travel from the origin to the destination, and a time to be required for travel from the origin to the destination, based on records of route selections made by the user in the past has been known (see, for example, Patent document 1).

CITATION LIST

Patent Document

[Patent document 1] Japanese Patent Laid-Open No. 08-271275

SUMMARY

An object of the present disclosure is to provide a technique that enables proposing a driving route suitable for an individual user.

The present disclosure can be regarded as providing an information processing apparatus for searching for a driving route for a vehicle to travel from an origin to a destination. The information processing apparatus in such case, for example, may include a control unit configured to:

acquire an origin and a destination of a mobile user that is a user wishing to travel via a vehicle;

extract a plurality of driving route candidates that the vehicle can take to travel from the origin to the destination;

acquire a route score for each of the plurality of driving route candidates, the route score including a travel cost that is based on a toll fee necessary for the vehicle to drive the driving route candidate and a required time for the vehicle to drive the driving route candidate, and a weight coefficient that is a coefficient correlated with a likelihood of the driving route candidate being selected as an actual driving route;

acquire a user score including a time-cost conversion rate that is a cost that the mobile user is presumed to be able to pay for travel per unit time and a weight application rate that is a rate of application of the weight coefficients to the mobile user and is set based on a selection tendency of the mobile user;

based on the respective route scores of the plurality of driving route candidates and the user score of the mobile user, convert the travel cost of each of the plurality of driving route candidates into a corresponding cost that is a cost obtained by reflection of the time-cost conversion rate and the weight application rate of the mobile user in the travel cost; and determine a recommendation order of the plurality of driving route candidates based on the corresponding costs of the plurality of driving route candidates.

Also, the present disclosure can be regarded as providing an information processing method for searching for a driving route for a vehicle to travel from an origin to a destination. The information processing method in such case, for example, may include causing a computer to perform:

a step of acquiring an origin and a destination of a mobile user that is a user wishing to travel via a vehicle;

a step of extracting a plurality of driving route candidates that the vehicle can take to travel from the origin to the destination;

a step of acquiring a route score for each of the plurality of driving route candidates, the route score including a travel cost that is based on a toll fee necessary for the vehicle to drive the driving route candidate and a required time for the vehicle to drive the driving route candidate, and a weight coefficient that is a coefficient correlated with a likelihood of the driving route candidate being selected as an actual driving route;

a step of acquiring a user score including a time-cost conversion rate that is a cost that the mobile user is presumed to be able to pay for travel per unit time and a weight application rate that is a rate of application of the weight coefficients to the mobile user and is set based on a selection tendency of the mobile user;

a step of, based on the respective route scores of the plurality of driving route candidates and the user score of the mobile user, converting the travel cost of each of the plurality of driving route candidates into a corresponding cost that is a cost obtained by reflection of the time-cost conversion rate and the weight application rate of the mobile user in the travel cost; and a step of determining a recommendation order of the plurality of driving route candidates based on the corresponding costs of the plurality of driving route candidates.

Also, the present disclosure provides an information processing program for causing a computer to perform the above information processing method or a computer-readable memory medium storing the information processing program in a non-transitory manner.

The present disclosure enables provision of a technique that enables proposing a driving route suitable for an individual user.

BRIEF DESCRIPTION OF THE DRAWINGS

FIG. 1 is a diagram illustrating an overview of a route search system.

FIG. 2 is a diagram illustrating respective hardware configurations of a user terminal and a server apparatus.

FIG. 3 is a block diagram illustrating an example functional configuration of the server apparatus.

FIG. 4 is a diagram illustrating an example configuration of an OD information table.

FIG. 5 is a diagram illustrating an example configuration of a user information table.

FIG. 6 is a flowchart illustrating a flow of data transmitted and received between components in the route search system and flows of processing performed in the respective components.

FIG. 7 is a flowchart illustrating a flow of processing performed by the server apparatus upon reception of OD information transmitted from the user terminal.

FIG. 8 is a flowchart illustrating a flow of processing performed by the server apparatus when the server apparatus calculates corresponding costs.

DESCRIPTION OF THE EMBODIMENTS

The present disclosure is characterized in that in presenting, to a user wishing to travel via a vehicle (mobile user), a plurality of driving route candidates the vehicle can take to travel from an origin to a destination, a recommendation order of the plurality of driving route candidates is determined to be an order more suitable to the user.

When a mobile user selects an actual driving route (route that a vehicle actually drive) from among a plurality of driving route candidates, factors emphasized by the mobile user are not limited to a toll fee and a required time. For example, the mobile user may possibly emphasize a factor such as a scenery from a window of the vehicle, a road shape, a degree of road maintenance and improvement or a facility on the driving route. It is presumed that more factors other than a toll fee and a required time are potentially included in a driving route candidate having a larger likelihood of being selected as an actual driving route (degree of potential of being selected (degree of being likely to be selected) as an actual driving route. Hereinafter, the likelihood may be referred to as "selection likelihood"). In the below, factors other than a toll fee and a required time are referred to "potential factors".

Here, if a selection likelihood of a driving route candidate having a toll fee and a required time that are larger than those of another driving route candidate is larger than that of the other driving route candidate, it can be presumed that a number of potential factors, the number being larger than that of the other driving route candidate, are included in the driving route candidate. Also, in two driving route candidates having respective toll fees and required times close to each other, if a selection likelihood of one driving route candidate is larger than that of the other driving route candidate, it can be presumed that a number of potential factors, the number being larger than that of the other driving route candidate, are included in the one driving route candidate. Therefore, it can be presumed that the selection likelihood of each driving route is correlated with the number of potential factors included in the driving route.

Note that a degree of emphasis on the potential factors in selecting an actual driving route from a plurality of driving route candidates differs depending on the user. For example, for a user having a strong tendency to select a driving route candidate having a relatively large selection likelihood as an actual driving route from among a plurality of driving route candidates, it can be presumed that the degree of emphasis on the above potential factors is large. On the other hand, for a user having a strong tendency to select a driving route candidate having a relatively small selection likelihood as an actual driving route from among a plurality of driving route candidates, it can be presumed that the degree of emphasis on the above potential factors is small.

Therefore, an information processing apparatus of the present disclosure is configured so that when a recommendation order of a plurality of driving route candidates is determined, selection likelihoods of the respective driving route candidates and a selection tendency of a mobile user are reflected in the recommendation order.

In more detail, in an information processing apparatus according to the present disclosure, a control unit extracts a plurality of driving route candidates connecting an origin and a destination that a mobile user wishes. Then, the control unit acquires a route score for each driving route candidate. The "route score" here refers to a score particular to each driving route candidate and includes a travel cost and a weight coefficient. The travel cost is a cost based on a toll fee and a required time of the driving route candidate and is a value that is a sum of a value obtained by conversion of the required time into a cost and the toll fee. A rate used for converting the required time into a cost (time-cost conversion rate) is a cost presumed to be payable for travel per unit time. Note that the time-cost conversion rate used for calculation of the travel cost is not one particular to the mobile user, but, for example, is an average value among a plurality of users (users each having a past record of selecting an actual driving route from among a plurality of driving route candidates). Also, the weight coefficient is a coefficient correlated with a likelihood of the driving route candidate being selected as an actual driving route. In other words, the weight coefficient is a coefficient representing a degree of the driving route candidate being likely to be selected. Such weight coefficient is set, for example, based on a selection rate that is a rate of selection of the driving route candidate as an actual driving route from among the plurality of driving route candidates. The selection rate is a ratio of the number of times of selection of the driving route candidate to a total number of times of selection from the plurality of driving route candidates. Where the weight coefficient is set based on such selection rate, if the selection rate is large, the weight coefficient may be set to have a large value in comparison with a case where the selection rate is small. In such case, it can be presumed that a driving route candidate having a large weight coefficient is a driving route candidate including a large number of potential factors (driving route candidate having a large selection likelihood) in comparison with a driving route candidate having a small weight coefficient.

Also, the control unit acquires a user score for the mobile user. The "user score" here includes a score particular to each user and includes a time-cost conversion rate and a weight application rate. The "time-cost conversion rate" here is a cost that the mobile user is presumed to be able to pay for travel per unit time and is a rate particular to the mobile user. Such time-cost conversion rate is set based on past records of driving route selections by the mobile user. For example, the time-cost conversion rate is calculated based on a difference in toll fee between a selected route and a comparative route and a difference in required time between the selected route and the comparative route at the time of a past driving route selection by the mobile user. The "selected route" here refers to a driving route candidate selected as an actual driving route from among a plurality of driving route candidates. Also, the "comparative route" is a driving route candidate not selected as an actual driving route from among the plurality of driving route candidates.

The weight application rate included in the user score indicates a rate of application of the weight coefficient to the mobile user. In other words, the weight application rate indicates a rate of reflection of the weight coefficients of each driving route candidate in determination of a recommendation order of a plurality of driving route candidates. Such weight application rate is set based on past results of actual driving route selections by the mobile user. For example, where the number of times of selection of a route candidate having a relatively large weight coefficient from among a plurality of driving route candidates is larger than the number of times of selection of a route candidate having a relatively small weight coefficient, the weight application rate is set to be larger as a difference between these numbers of times is larger. Where the weight application rate set in such a manner as above is large, the mobile user can be considered as having a selection tendency to emphasize the above potential factors, in comparison with a case where the weight application rate is small.

Next, the control unit converts the travel costs of the driving route candidates into corresponding costs based on the respective route scores of the plurality of driving route candidates above and the user score of the mobile user. Each "corresponding cost" here is a cost obtained by reflection of the user score of the mobile user in the travel cost of the relevant driving route candidate. For example, the control unit first recalculates a travel cost of each driving route candidate using the time-cost conversion rate particular to the mobile user. Subsequently, the control unit calculates a corresponding cost based on Expression (1) below, which uses the recalculated travel cost, the weight coefficient particular to the driving route candidate and the weight application rate particular to the mobile user:

(corresponding cost)=(travel cost)/((weight coefficient)×(weight application rate)+1)      Expression (1).

The corresponding cost calculated according to Expression (1) above becomes smaller as the weight coefficient is larger. In other words, from among the plurality of driving route candidates, a driving route candidate having a larger weight coefficient (driving route candidate including a larger number of potential factors) has a smaller travel cost. Also, the corresponding cost calculated according to Expression (1) above becomes smaller as the weight application rate is larger. In other words, as the mobile user has a stronger selection tendency to emphasize potential factors, the corresponding cost becomes smaller. In short, for a mobile user having a strong selection tendency to emphasize potential factors, a corresponding cost of a driving route candidate including a relatively large number of potential factors from among a plurality of driving route candidates is relatively small.

Upon calculation of the respective corresponding costs of the plurality of driving route candidates according the above-described method, the control unit determines a recommendation order of the plurality of driving route candidates based on the corresponding costs. For example, where the corresponding costs of the driving route candidates are calculated based on Expression (1) above, the control unit sets the recommendation order of the plurality of driving route candidates to an ascending order of the corresponding costs. Consequently, for a mobile user having a strong selection tendency to emphasize potential factors, a recommendation ranking of a driving route candidate including a relatively large number of potential factors from among the plurality of driving route candidates becomes relatively high.

Therefore, the information processing apparatus of the present disclosure enables reflecting the selection likelihoods of the driving routes and the selection tendency of the mobile user in the recommendation order of the plurality of driving route candidates. Consequently, the information processing apparatus of the present disclosure also enables proposing a driving route candidate suitable for an individual user.

A specific embodiment of the present disclosure will be described below with reference to the drawings. Dimensions, materials, shapes, relative dispositions, etc., of components described in the present embodiment are not intended to limit the technical scope of the disclosure only thereto unless specifically noted.

Embodiment

The present embodiment will be described in terms of an example in which an information processing apparatus of the present disclosure is applied to a system that when a user wishing to travel via a vehicle (mobile user) has designated an origin and a destination, searches for driving route candidates to be presented to the mobile user (hereinafter may be referred to as "route search system").

(Overview of Route Search System)

FIG. 1 is a diagram illustrating an overview of a route search system. In the example illustrated in FIG. 1, the route search system includes a vehicle 100, a user terminal 200 and a server apparatus 300. The user terminal 200 and the server apparatus 300 are connected via a network N1. The network is, for example, a WAN (wide area network), which is a worldwide public communication network such as the Internet, or another communication network or the like. Note that the user terminal 200 is connected to the network N1 by use of radio communication. Examples of the radio communication include, e.g., mobile communications such as 5G and LTE (Long-Term Evolution), narrowband communications such as DSRC (dedicated short-range communications) and Wi-Fi (registered trademark).

Although in the example illustrated in FIG. 1, only a single vehicle 100 and a single user terminal 200 are illustrated, it is assumed that there are a plurality of vehicles 100 and a plurality of user terminals 200 under the control of the server apparatus 300.

The vehicle 100 is a vehicle that a mobile user uses to travel from an origin to a destination. The user terminal 200 is a terminal apparatus that the mobile user uses. A predetermined application for using a route search service has been installed in the user terminal 200. The mobile user can transmit information indicating an origin and a destination that the mobile user wishes (hereinafter may be referred to as "OD (origin-destination) information") to the server apparatus 300 by causing the user terminal 200 to execute the above predetermined application. Also, the mobile user can receive information indicating a result of a driving route search by the server apparatus 300 (hereinafter may be referred to as "search result information") via the user terminal 200. Search result information in the present example includes data representing each of a plurality of driving route candidates in the form of an aggregate of road links (hereinafter may be referred to as "road link data") and information indicating a recommendation order of the plurality of driving route candidates.

The server apparatus 300 extracts a candidate of a driving route connecting the origin and the destination that the user wishes (driving route candidate), based on the OD information received from the user terminal 200. At that time, if a plurality of driving route candidates are extracted, the server apparatus 300 determines a recommendation order of the plurality of driving route candidates based on selection likelihoods of the respective driving route candidates and a selection tendency of the mobile user. Then, the server apparatus 300 transmits search result information including respective road link data of the plurality of driving route candidates and information indicating the recommendation order of the plurality of driving route candidates back to the user terminal 200. Note that in the present example, the server apparatus 300 corresponds to the "information processing apparatus" in the present disclosure.

(Hardware Configuration)

FIG. 2 is a diagram illustrating respective example hardware configurations of the user terminal 200 and the server apparatus 300.

The server apparatus 300 has a general computer configuration. In other words, the server apparatus 300 includes a processor 301, a main storage device 302, an auxiliary storage device 303 and a communication device 304. These components are interconnected via a bus. Each of the main storage device 302 and the auxiliary storage device 303 is a computer-readable recording medium. The computer hardware configuration is not limited to the example illustrated in FIG. 2 and appropriate omission, replacement and addition of components are possible.

The server apparatus 300 implements a function that conforms to a predetermined purpose by the processor 301 loading a program stored in a recording medium into a working area of the main storage device 302 and executing the program and respective functional component units and the like being controlled through the execution of the program.

The processor 301 is, for example, a CPU (central processing unit) or a DSP (digital signal processor). The processor 301 controls the server apparatus 300 and performs arithmetic operations for various types of information processing. The main storage device 302 includes, for example, a RAM (random access memory) and a ROM (read-only memory). The auxiliary storage device 303 includes, for example, an EPROM (erasable programmable ROM) and/or a hard disk drive (HDD). Also, the auxiliary storage device 303 can include a removable medium, that is, a portable recording medium. The removable medium is, for example, a USB (universal serial bus) memory or a disk recording medium such as a CD (compact disc) or a DVD (digital versatile disc).

The auxiliary storage device 303 stores various programs, various data and various tables in a readable/writable manner on the recording medium. In the auxiliary storage device 303, e.g., an operating system (OS), various programs and various tables are stored. Note that these pieces of information may partly or fully stored in the main storage device 302. Also, information stored in the main storage device 302 may be stored in the auxiliary storage device 303.

The communication device 304 performs transmission and reception of information between an external apparatus and the server apparatus 300. The communication device 304 is, for example, a LAN (local area network) interface board or a radio communication circuit for radio communication. The LAN interface board or the radio communication circuit is connected to the network N1.

A series of steps of processing performed by the server apparatus 300 configured as described above can be performed by hardware but can also be performed by software.

Next, the user terminal 200 is, for example, a small computer that the user can carry such as a smartphone, a mobile phone, a tablet terminal, a personal information terminal or a wearable computer (e.g., a smartwatch). Note that the user terminal 200 may be a personal computer (PC) connected to the server apparatus 300 via the network N1 such as the Internet, which is a public communication network. Also, the user terminal 200 may be a car navigation system mounted in the vehicle 100. In such case, the car navigation system is configured to be connectable to the network N1 using radio communication.

The user terminal 200 includes a processor 201, a main storage device 202, an auxiliary storage device 203, a display device 204, an input device 205, a position acquisition device 206 and a communication device 207. These components are interconnected via a bus. The processor 201, the main storage device 202 and the auxiliary storage device 203 are similar to the processor 301, the main storage device 302 and the auxiliary storage device 303 in the server apparatus 300, and thus, description thereof will be omitted. The display device 204 is, for example, an LCD (liquid crystal display) or an EL (electroluminescence) panel. The input device 205 includes, for example, a touch panel or push buttons that enable input of codes such as characters, a microphone that enables input of voice or a camera that can pick up a moving image and/or a still image. The position acquisition device 206 is a device that acquires a current position of the user terminal 200 and typically includes, e.g., a GPS receiver. The communication device 207 is, for example, a communication circuit for data communication with, e.g., the server apparatus 300 by accessing the network N1 using a mobile communication service (a telephone communication network for, e.g., mobile phones or radio communications such as Wi-Fi). Note that the hardware configuration of the user terminal 200 is not limited to the example illustrated in FIG. 2 and appropriate omission, replacement and addition of components are possible.

A series of steps of processing to be performed by the user terminal 200 configured as described above can be performed by hardware but can also be performed by software.

(Functional Configuration of Server Apparatus)

Here, a functional configuration of the server apparatus 300 in the present example will be described with reference to FIG. 3. As illustrated in FIG. 3, the server apparatus 300 in the present example includes an OD information acquisition unit F310, a driving route candidate extraction unit F320, a route score acquisition unit F330, a user score acquisition unit F340, a corresponding cost calculation unit F350, a recommendation order determination unit F360, an OD information management database D310 and a user score management database D320 as functional components thereof.

The OD information acquisition unit F310, the driving route candidate extraction unit F320, the route score acquisition unit F330, the user score acquisition unit F340, the corresponding cost calculation unit F350 and the recommendation order determination unit F360 are formed by the processor 301 in the server apparatus 300 executing a computer program in the main storage device 302. A combination of the OD information acquisition unit F310, the driving route candidate extraction unit F320, the route score acquisition unit F330, the user score acquisition unit F340, the corresponding cost calculation unit F350 and the recommendation order determination unit F360 corresponds to the "control unit" according to the present disclosure. Note that any or a part of the OD information acquisition unit F310, the driving route candidate extraction unit F320, the route score acquisition unit F330, the user score acquisition unit F340, the corresponding cost calculation unit F350 and the recommendation order determination unit F360 may be formed by a hardware circuit.

The OD information management database D310 and the user score management database D320 are built by a database management system (DBMS) managing data stored in the auxiliary storage device 303. The database management system is a program executed by the processor 301 in the server apparatus 300. The OD information management database D310 and the user score management database D320 are, for example, relational databases.

Note that any of the functional components of the server apparatus 300 or a part of processing performed by the functional components may be implemented by another computer connected to the network N1.

In the OD information management database D310, information relating to driving route candidates for each OD is stored and OD information and the information relating to driving route candidates are linked with each other. Here, an example configuration of the information stored in the OD information management database D310 will be described with reference to FIG. 4. FIG. 4 is a diagram illustrating an example table configuration of the information stored in the OD information management database D310. The configuration of the table stored in the OD information management database D310 (hereinafter may be referred to as "OD information table") is not limited to the example illustrated in FIG. 4 and appropriate addition, change and deletion of fields are possible.

The OD information table illustrated in FIG. 4 includes respective fields of, e.g., OD-ID, OD information, route ID, route information, toll fee, required time, travel cost and weight coefficient. In the OD-ID field, OD-IDs, which are information pieces for identifying respective ODs are registered. In the OD information field, information pieces relating to origins and destinations of the respective ODs are registered. Note that as information pieces registered in the OD information field, not information pieces indicating respective spots of the origins and the destinations, but information pieces indicating respective areas including the origins and the destinations are registered. Such areas are, for example, areas segmented by municipality. In the below, an area including an origin is referred to as "origin area", an area including a destination is referred to as "destination area" and an information piece registered in the OD information field is referred to as "OD area information piece". Also, in the route ID field, route IDs, which are information pieces for individually identifying driving route candidates each connecting an origin area and a destination area for each OD are registered. In the route information field, road link data of each driving route candidate is registered. In the toll fee field, information pieces indicating fees necessary for driving the respective driving route candidates are registered. For example, if a toll road is included in at least a part of a driving route candidate, an information piece indicating a toll fee for the toll road is registered in the toll fee field. Also, if no toll road is included in a driving route candidate, an information piece indicating that a toll fee is "0" is registered. Also, in the required time field, information pieces indicating respective required times required for a vehicle to drive the respective driving route candidates are registered. Each of the information pieces registered in the required time field is an information piece indicating an average required time among a plurality of vehicles each having a track record of driving a relevant driving route candidate. In the travel cost field, information pieces indicating travel costs of the respective driving route candidates are registered. The "travel cost" here is a total of a value obtained by converting a required time for a driving route candidate into a cost and a toll fee for the driving route candidate and is calculated based Expression (2) below.

$$(\text{travel cost}) = (\text{toll fee}) + (\text{reference rate}) \times (\text{required time}) \quad (2)$$

The "reference rate" in Expression (2) above is an average time-cost conversion rate among a plurality of users each having a track record of selecting the driving route candidate as an actual driving route. Note that the time-cost conversion rate is a cost that each user is presumed to be able to pay for travel per unit time and details thereof will be described later.

Also, in the weight coefficient field, information pieces indicating weight coefficients of the respective driving route candidates are registered. The "weight coefficient" here is a coefficient correlated with a selection likelihood of each driving route candidate. In other words, the weight coefficient is a coefficient that becomes larger as the selection likelihood of the driving route candidate is larger. Such weight coefficient is set based on a ratio (selection rate) of the number of times of selection of the driving route candidate to the number of times of selection from the plurality of driving route candidates. For example, where the selection rate of the driving route candidate is large, the weight coefficient is set to have a large value in comparison with a case where the selection rate of the driving route candidate is small. Note that a calculation model that outputs weight coefficients upon reception of an input of the number of times of selection of each driving route candidate of a plurality of driving route candidates may be built in advance. In building such calculation model, a ratio between a travel cost of each driving route candidate and a travel cost of another driving route candidate may be taken into consideration. In short, a calculation model to be used for setting weight coefficients only needs to be built so as to conform to selection likelihoods of respective driving route candidates.

Note that the information pieces registered in the required time field, the travel cost field and the weight coefficient field of the OD information table described above are updated each time a driving route candidate is selected as an actual driving route (each time the number of times of selection is updated).

In the user score management database D320, information pieces relating to user scores of the respective users are stored and identification information and the user score information of the respective users are linked with each other. Here, an example configuration of the information pieces stored in the user score management database D320 will be described with reference to FIG. 5. FIG. 5 is a diagram illustrating an example table configuration of the information pieces stored in the user score management database D320. The configuration of the table stored in the user score management database D320 (hereinafter may also be referred to as "user information table") is not limited to the example illustrated in FIG. 5 and appropriate addition, change and deletion of fields are possible.

The user information table illustrated in FIG. 5 includes respective fields of, e.g., user ID, time-cost conversion rate and weight application rate. In the user ID field, user IDs, which are information pieces for identifying the respective users, are registered. In the time-cost conversion rate field, information pieces indicating time-cost conversion rates particular to the respective users (hereinafter may be referred to as "individual rates") are stored. The individual rates are obtained according to the following steps.

(Step 1) A tentative rate is calculated according to Expression (3) below, which uses a toll fee difference and a required time difference between a driving route candidate selected as an actual driving route (selected route) and a driving route candidate (comparative route) not selected as an actual driving route in a past record of a user selecting an actual driving route from among a plurality of driving route candidates.

$$(\text{tentative rate}) = (\text{toll fee difference})/(\text{required time difference}) \qquad (3)$$

(Step 2) If the toll fee of the selected route is larger than the toll fee of the comparative route, a value obtained by adding a predetermined margin to the tentative rate is set as an individual rate. On the other hand, if the toll fee of the selected route is smaller than the toll fee of the comparative route, a value obtained by subtracting a predetermined margin from the tentative rate is set as an individual rate.

Also, in the weight application rate field, information pieces indicating weight application rates of the respective users are registered. Each of the weight application rates is data indicating a rate of application of weight coefficients of driving route candidates to the relevant user and the weight application rates are data particular to the respective users. Each weight application rate is set based on the number of times of selection of a route candidate having a relatively large weight coefficient from among a plurality of driving route candidates and the number of times of selection of a route candidate having a relatively small weight coefficient from among a plurality of driving route candidates in past records of actual driving route selection by a mobile user. For example, if the number of times of selection of a route candidate having a relatively large weight coefficient from among a plurality of driving route candidates is larger than the number of times of selection of a route candidate having a relatively small weight coefficient from among a plurality of driving route candidates, the weight application rate is set to be larger as a difference between these numbers of times is larger. Note that a calculation model that outputs an application rate upon reception of an input of the number of times of selection of a route candidate having a relatively large weight coefficient from among a plurality of driving route candidates and the number of times of selection of a route candidate having a relatively small weight coefficient from among a plurality of driving route candidates may be built in advance. The calculation model in such case only needs to be built in such a manner that a weight application rate is set to be larger for a user having a stronger selection tendency to emphasis the aforementioned potential factors.

Next, the OD information acquisition unit F310 acquires the OD information of the mobile user. More specifically, the OD information acquisition unit F310 acquires the OD information of the mobile user by receiving the OD information transmitted from the user terminal 200 to the server apparatus 300, via the communication device 304. The OD information acquired by the OD information acquisition unit F310 is passed to the driving route candidate extraction unit F320.

The driving route candidate extraction unit F320 extracts driving route candidates each connecting the origin and the destination of the mobile user, based on the OD information of the mobile user. More specifically, the driving route candidate extraction unit F320 first identifies an area including the origin of the mobile user (origin area) and an area including the destination of the mobile user (destination area). Subsequently, the driving route candidate extraction unit F320 accesses the OD information management database D310 and identifies an OD information table including an OD information field in which OD area information matching a combination of the origin area and the destination area of the mobile user is registered. Then, the driving route candidate extraction unit F320 extracts all route IDs registered in a route ID field of the identified OD information table. The route IDs of the driving route candidates are passed from the driving route candidate extraction unit F320 to the route score acquisition unit F330.

The route score acquisition unit F330 accesses the OD information management database D310 based on the above route IDs and identifies an OD information table corresponding to the above route IDs. Then, the route score acquisition unit F330 acquires information pieces registered in a travel cost field of the identified OD information table (travel costs) and information pieces registered in a weight coefficient field of the identified OD information table (weight coefficients) as route scores of the driving route candidates. The route scores of the driving route candidates are passed from the route score acquisition unit F330 to the corresponding cost calculation unit F350.

The user score acquisition unit F340 accesses the user score management database D320 based on a user ID of the mobile user and identifies a user information table corresponding to the user ID of the mobile user. Then, the user score acquisition unit F340 acquires information registered in a time-cost conversion rate field of the identified user information table (individual rate) and information registered in a weight application rate field of the identified user information table (weight application rate) as a user score of the mobile user. The user score acquired by the user score acquisition unit F340 is passed to the corresponding cost calculation unit F350. Note that the user ID used when the user score acquisition unit F340 identifies a user information table of the mobile user is attached to the OD information when the OD information is transmitted from the user terminal 200 to the server apparatus 300.

The corresponding cost calculation unit F350 calculates corresponding costs of the respective driving route candidates based on the route scores of the driving route candidates and the user score of the mobile user. Each of the corresponding costs in the present example is a cost obtained by reflection of the user score of the mobile user in the travel cost of the relevant driving route candidate. In the present example, the corresponding cost calculation unit F350 first recalculates a travel cost of each driving route candidates using the individual rate of the mobile user. Subsequently, the corresponding cost calculation unit F350 calculates a corresponding cost based on Expression (1) below, which uses the recalculated travel cost, the weight coefficient particular to the driving route candidate and the weight application rate particular to the mobile user.

$$(\text{corresponding cost}) = (\text{travel cost})/((\text{weight coefficient}) \times (\text{weight application rate}) + 1) \qquad \text{Expression (1)}$$

The corresponding cost calculated according to Expression (1) above has a smaller value as the weight coefficient of the driving route candidate is larger. In other words, the corresponding cost becomes smaller as the driving route candidate includes a larger number of potential factors. Furthermore, as the weight application rate of the mobile user is larger, the corresponding cost becomes smaller. In other words, the corresponding cost is larger if the mobile user has a stronger selection tendency to emphasis potential factors. Therefore, for a mobile user having a stronger selection tendency to emphasis potential factors, a corresponding cost of a driving route candidate including a larger number of potential factors becomes even smaller. On the other hand, for a mobile user having a weaker selection tendency to emphasize potential factors, a corresponding cost of a driving route candidate having a small travel cost becomes even smaller. In such case, if the individual rate of the mobile user is larger (if the mobile user has a stronger selection tendency to emphasize a required time), a corresponding cost of a driving route candidate having a shorter required time becomes even smaller. Also, if the individual rate of the mobile user is smaller (if the mobile user has a stronger selection tendency to emphasize a toll fee), a corresponding cost of a driving route candidate having a smaller toll fee becomes even smaller. Note that the corresponding costs of the driving route candidates are passed from the corresponding cost calculation unit F350 to the recommendation order determination unit F360.

The recommendation order determination unit F360 determines a recommendation order of the plurality of driving route candidates extracted by the driving route candidate extraction unit F320, based on the corresponding costs calculated by the corresponding cost calculation unit F350. In the present example, the recommendation order of the plurality of driving route candidates is determined to be an ascending order of the corresponding costs. In other words, if the mobile user has a strong selection tendency to emphasize potential factors, from among the plurality of driving route candidates, a driving route candidate including a larger number of potential factors is more highly ranked in the recommendation order. On the other hand, if the mobile user has a weak selection tendency to emphasize potential factors, from among the plurality of driving route candidates, a driving route candidate having a smaller travel cost is more highly ranked in the recommendation order. In more detail, if the mobile user has a strong selection tendency to emphasize a required time, from among the plurality of driving route candidates, a driving route candidate having a shorter required time is more highly ranked in the recommendation order. Also, if the mobile user has a strong selection tendency to emphasize a toll fee, from among the plurality of driving route candidates, a driving route candidate having a smaller toll fee is more highly ranked in the recommendation order. Note that the recommendation order determined by the recommendation order determination unit F360 is transmitted together with road link data of the driving route candidates from the communication device 304 to the user terminal 200.

(Flow of Processing)

Here, processing performed by respective components in the route search system will be described. FIG. 6 is a flowchart illustrating an overview of a flow of data transmitted and received between respective components in the route search system and flows of processing performed by the respective components.

In FIG. 6, the user terminal 200 receives OD information (step S11). More specifically, in the user terminal 200, information indicating an origin and a destination (OD information) is received by the mobile user performing an operation to designate the origin and the destination via the input device 205. Then, in the user terminal 200, the OD information and a user ID of the mobile user are transmitted to the server apparatus 300 via the communication device 207 (step S12).

Upon the OD information and the user ID transmitted from the user terminal 200 being received by the communication device 304 of the server apparatus 300, the server apparatus 300 performs route search processing (step S13). Here, a flow of the route search processing by the server apparatus 300 will be described with reference to FIG. 7. FIG. 7 is a flowchart illustrating a flow of processing performed by the server apparatus 300 upon reception of OD information from the user terminal 200.

In FIG. 7, the OD information acquisition unit F310 of the server apparatus 300 acquires the OD information and the user ID received by the communication device 304 (step S101). Subsequently, the driving route candidate extraction unit F320 extracts driving route candidates each connecting the origin and the destination designated in the OD information (step S102). More specifically, as described above, the driving route candidate extraction unit F320 identifies an origin area including the origin and a destination area including the destination. Subsequently, the driving route candidate extraction unit F320 identifies an OD information table including an OD information field in which OD area information matching a combination of the origin area and the destination area is registered. Then, the driving route candidate extraction unit F320 extracts all route IDs registered in a route ID field registered in the identified OD information table.

In step S103, route scores of the respective driving route candidates are acquired based on the route IDs extracted in step S102 above. More specifically, the route score acquisition unit F330 of the server apparatus 300 reads out travel costs registered in a travel cost field of the OD information table corresponding to the route IDs and weight coefficients registered in the weight coefficient field of the OD information table.

In step S104, a user score of the mobile user is acquired based on the user ID acquired in step S101 above. More specifically, the user score acquisition unit F340 of the server apparatus 300 accesses the user score management database D320 based on the user ID and identifies a user information table corresponding to the user ID. Then, the user score acquisition unit F340 reads out an individual rate registered in a time-cost conversion rate field of the user information table and a weight application rate registered in a weight application rate field of the user information table.

In step S105, corresponding costs of the respective driving route candidates are calculated based on the route score acquired in step S103 above and the user score acquired in step S104 above. More specifically, as illustrated in FIG. 8, the corresponding cost calculation unit F350 of the server apparatus 300 first recalculates travel costs of the respective driving route candidates using the individual rate of the mobile user (step S1051). Subsequently, the corresponding cost calculation unit F350 calculates corresponding costs of the respective driving route candidates based on Expression (1) above, which uses the recalculated travel costs, the weight coefficients particular to the respective driving route candidates and the weight application rate particular to the mobile user (step S1052).

In step S106, a recommendation order of the plurality of driving route candidates is determined based on the corresponding costs of the driving route candidates calculated in step S105 above. More specifically, the recommendation order determination unit F360 of the server apparatus 300 determines a recommendation order of the plurality of driving route candidates to be an ascending order of the corresponding costs.

In step S107, information including road link data of the driving route candidates extracted in step S102 above and the recommendation order determined in S106 above (search result information) are transmitted to the user terminal 200 through the communication device 304 of the server apparatus 300.

Here, referring back to FIG. 6, upon the search result information being transmitted from the server apparatus 300 to the user terminal 200 (step S14), in the user terminal 200, the search result information is displayed on the display device 204 (step S15). Consequently, the mobile user can select an actual driving route with reference to the recommendation order of the plurality of driving route candidates.

Then, upon an actual driving route being selected from the plurality of driving route candidates included in the search result information, a route guide is started by an application on the user terminal 200 (step S16).

According to the flowcharts in FIGS. 6 and 7, for a mobile user having a strong selection tendency to emphasize potential factors that are factors other than a toll fee and a required time, a driving route candidate including a larger number of potential factors can be recommended. On the other hand, for a mobile user having a weak selection tendency to emphasize potential factors, a driving route candidate having a smaller travel cost can be recommended. For example, a mobile user having a strong selection tendency to emphasize a required time, a driving route candidate having a shorter required time can be recommended. Also, for a mobile user having a strong selection tendency to emphasize a toll fee, a driving route candidate having a smaller toll fee can be recommended. Therefore, the present embodiment enables presenting a driving route candidate suitable for an individual user.

<Others>

The above-described embodiment is definitely an example and the present disclosure can be implemented with appropriate changes made thereto without departing from the spirit thereof.

Also, the processing and configuration described in the present disclosure can freely be combined as long as such combination causes no technical contraction. For example, although the above embodiment has been described in terms of an example in which the "information processing apparatus" in the present disclosure is applied to a server apparatus, the "information processing apparatus" in the present disclosure may be applied to a user terminal. In other words, processing described as being performed by a server apparatus may be performed by a user terminal. Also, processing described as being performed by a server apparatus may be shared by the server apparatus and a user terminal. On the other hand, processing described as being performed by a user terminal may be performed by a server apparatus. In a computer system, what hardware configuration is employed to implement each function can flexibly be changed.

Also, the present disclosure can also be implemented by supplying a computer program for implementing the functions described in the above embodiment (information processing program) to a computer and causing one or more processors included in the computer to read and execute the program. The computer in such case may be a server apparatus or may be a user terminal. Such computer program may be provided to the computer via a non-transitory computer-readable memory medium that is connectable to a system bus of the computer or may be provided to the computer via a network. The non-transitory computer-readable memory medium is a recording medium that stores information such as data and programs by electrical, magnetic, optical, mechanical or chemical actions and allows the information to be read from, e.g., a computer. Such non-transitory computer-readable memory medium is, for example, an arbitrary type of disk such as a magnetic disk (e.g., a floppy (registered trademark) disk or a hard disk drive (HDD)) or an optical disk (a CD-ROM, a DVD or a Blu-ray Disc). Also, the non-transitory computer-readable memory medium may be a medium such as a read-only memory (ROM), a random access memory (RAM), an EPROM, an EEPROM, a magnetic card, a flash memory, an optical card or an SSD (solid-state drive).

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An information processing apparatus for searching for a driving route for a vehicle to travel from an origin to a destination, the information processing apparatus comprising:

an origin-destination (OD) information management database;

a user score management database; and a controller configured to:

acquire, from a user terminal, an origin and a destination of a mobile user that is a user wishing to travel via a vehicle;

extract, from the OD information management database, a plurality of driving route candidates that the vehicle can take to travel from the origin to the destination;

acquire, from the OD information management database, a route score for each of the plurality of driving route candidates, the route score including a travel cost that is based on a toll fee necessary for the vehicle to drive the driving route candidate and a required time for the vehicle to drive the driving route candidate, and a weight coefficient that is a coefficient correlated with a likelihood of the driving route candidate being selected as an actual driving route, wherein, based on past records of actual driving route selection by the mobile user stored in the OD information management database, the weight coefficient is set based on a selection rate that is a rate of a number of times of selection of the driving route candidate as an actual driving route from among the plurality of driving route candidates;

acquire a user score from the user score management database, including a time-cost conversion rate that is a cost that the mobile user is presumed to be able to pay for travel per unit time and a weight application rate that is a rate of application of the weight coefficients to the mobile user and is set based on a selection tendency of the mobile user, wherein the time-cost conversion rate of the mobile user is calculated based on a difference in toll fee between a selected route that is a driving route candidate selected by the mobile user and a comparative route that is a driving route candidate not selected by the mobile user in a past record of actual driving route selection by the mobile user and a difference in required time between the selected route and the comparative route;

based on the respective route scores of the plurality of driving route candidates and the user score of the mobile user, convert the travel cost of each of the plurality of driving route candidates into a corresponding cost that is a cost obtained by reflection of the time-cost conversion rate and the weight application rate of the mobile user in the travel cost;

determine a recommendation order of the plurality of driving route candidates based on the corresponding costs of the plurality of driving route candidates;

transmit, to the user terminal, the plurality of driving route candidates in the recommendation order so that the plurality of driving route candidates is displayed for selection by the mobile user; and update the weight coefficient for the plurality of driving route candidates in the OD management information database each time a driving route candidate is selected as an actual driving route by the mobile user.

2. The information processing apparatus according to claim 1, wherein the weight coefficient is increased as the selection rate of the driving route candidate increases.

3. The information processing apparatus according to claim 1, wherein the travel cost is calculated according to the following expression that uses an average value of the time-cost conversion rates of a plurality of users, the required time of the driving route candidate and the toll fee of the driving route candidate:

(travel cost)=(toll fee)+(average value of time-cost conversion rates)×(required time).

4. The information processing apparatus according to claim 1, wherein if the toll fee of the selected route is larger than the toll fee of the comparative route, a value obtained by adding a predetermined margin to a tentative rate calculated according to the following expression is set as the time-cost conversion rate of the mobile user, and if the toll fee of the selected route is smaller than the toll fee of the comparative route, a value obtained by subtracting a predetermined margin from the tentative rate calculated according to the following expression is set as the time-cost conversion rate of the mobile user:

(tentative rate)=(toll fee difference)/(required time difference).

5. The information processing apparatus according to claim 1, wherein when the travel cost of each of the plurality of driving route candidates is converted into the corresponding cost, the controller recalculates the travel cost of each of the plurality of driving route candidates using the time-cost conversion rate particular to the mobile user, and calculates the corresponding cost according to the following expression that uses the recalculated travel cost, the weight coefficient and the weight application rate (corresponding cost)=(travel cost)/((weight coefficient)×(weight application rate)+1).

6. The information processing apparatus according to claim 5, wherein the controller sets the recommendation order of the plurality of driving route candidates to an ascending order of the corresponding costs.

7. The information processing apparatus according claim 1, wherein the controller is configured to execute a route guidance using the driving route candidate that was selected by the mobile user from among the plurality of driving route candidates displayed in the recommendation order.

8. An information processing method for searching for a driving route for a vehicle to travel from an origin to a destination, the information processing method comprising causing a computer to perform:

a step of acquiring, from a user terminal, an origin and a destination of a mobile user that is a user wishing to travel via a vehicle;

a step of extracting, from an origin-destination (OD) management database, a plurality of driving route candidates that the vehicle can take to travel from the origin to the destination;

a step of acquiring, from the OD information management database, a route score for each of the plurality of driving route candidates, the route score including a travel cost that is based on a toll fee necessary for the vehicle to drive the driving route candidate and a required time for the vehicle to drive the driving route candidate, and a weight coefficient that is a coefficient correlated with a likelihood of the driving route candidate being selected as an actual driving route, wherein, based on past records of actual driving route selection by the mobile user stored in the OD information management database, the weight coefficient is set based on a selection rate that is a rate of a number of times of selection of the driving route candidate as an actual driving route from among the plurality of driving route candidates;

a step of acquiring a user score from the user score management database, including a time-cost conversion rate that is a cost that the mobile user is presumed to be able to pay for travel per unit time and a weight application rate that is a rate of application of the weight coefficients to the mobile user and is set based on a selection tendency of the mobile user, wherein the time-cost conversion rate of the mobile user is calculated based on a difference in toll fee between a selected route that is a driving route candidate selected by the mobile user and a comparative route that is a driving route candidate not selected by the mobile user in a past record of actual driving route selection by the mobile user and a difference in required time between the selected route and the comparative route;

a step of, based on the respective route scores of the plurality of driving route candidates and the user score of the mobile user, converting the travel cost of each of the plurality of driving route candidates into a corresponding cost that is a cost obtained by reflection of the time-cost conversion rate and the weight application rate of the mobile user in the travel cost;

a step of determining a recommendation order of the plurality of driving route candidates based on the corresponding costs of the plurality of driving route candidates;

a step of transmitting, to the user terminal, the plurality of driving route candidates tin the recommendation order so that the plurality of driving route candidates is displayed for selection by the mobile user; and a step of updating the weight coefficient for the plurality of driving route candidates in the OD management information database each time a driving route candidate is selected as an actual driving route by the mobile user.

9. The information processing method according to claim 8, wherein the weight coefficient is increased as the selection rate of the driving route candidate increases.

10. The information processing method according to claim 8, wherein the travel cost is calculated according to the following expression that uses an average value of the time-cost conversion rates of a plurality of users, the required time of the driving route candidate and the toll fee of the driving route candidate:

(travel cost)=(toll fee)+(average value of time-cost conversion rates)×(required time).

11. The information processing method according to claim 8, wherein if the toll fee of the selected route is larger than the toll fee of the comparative route, a value obtained by adding a predetermined margin to a tentative rate calculated according to the following expression is set as the time-cost conversion rate of the mobile user, and if the toll fee of the selected route is smaller than the toll fee of the comparative route, a value obtained by subtracting a predetermined margin from the tentative rate calculated according to the following expression is set as the time-cost conversion rate of the mobile user:

(tentative rate)=(toll fee difference)/(required time difference).

12. The information processing method according to claim 8, wherein in the step of converting the travel cost of each of the plurality of driving route candidates into a corresponding cost, the computer performs:
a step of recalculating the travel cost of each of the plurality of driving route candidates using the time-cost conversion rate particular to the mobile user; and
a step of calculating the corresponding cost according to the following expression that uses the recalculated travel cost, the weight coefficient and the weight application rate (corresponding cost)=(travel cost)/((weight coefficient)×(weight application rate)+1).

13. The information processing method according to claim 12, wherein the recommendation order of the plurality of driving route candidates is set to an ascending order of the corresponding costs.

14. The information processing method according to claim 8, further comprising a step of executing a route guidance using the driving route candidate that was selected by the mobile user from among the plurality of driving route candidates displayed in the recommendation order.

15. A non-transitory memory medium storing an information processing program for searching for a driving route for a vehicle to travel from an origin to a destination, the information processing program causing a computer to perform:
a step of acquiring, from a user terminal, an origin and a destination of a mobile user that is a user wishing to travel via a vehicle;
a step of extracting from an origin-destination (OD) management database, a plurality of driving route candidates that the vehicle can take to travel from the origin to the destination;
a step of acquiring, from the OD information management database, a route score for each of the plurality of driving route candidates, the route score including a travel cost that is based on a toll fee necessary for the vehicle to drive the driving route candidate and a required time for the vehicle to drive the driving route candidate, and a weight coefficient that is a coefficient correlated with a likelihood of the driving route candidate being selected as an actual driving route, wherein, based on past records of actual driving route selection by the mobile user stored in the OD information management database, the weight coefficient is set based on a selection rate that is a rate of a number of times of selection of the driving route candidate as an actual driving route from among the plurality of driving route candidates;
a step of acquiring a user score from the user score management database, including a time-cost conversion rate that is a cost that the mobile user is presumed to be able to pay for travel per unit time and a weight application rate that is a rate of application of the weight coefficients to the mobile user and is set based on a selection tendency of the mobile user, wherein the time-cost conversion rate of the mobile user is calculated based on a difference in toll fee between a selected route that is a driving route candidate selected by the mobile user and a comparative route that is a driving route candidate not selected by the mobile user in a past record of actual driving route selection by the mobile user and a difference in required time between the selected route and the comparative route;
a step of, based on the respective route scores of the plurality of driving route candidates and the user score of the mobile user, converting the travel cost of each of the plurality of driving route candidates into a corresponding cost that is a cost obtained by reflection of the time-cost conversion rate and the weight application rate of the mobile user in the travel cost;
a step of determining a recommendation order of the plurality of driving route candidates based on the corresponding costs of the plurality of driving route candidates;
a step of transmitting, to the user terminal, the plurality of driving route candidates in the recommendation order so that the plurality of driving route candidates is displayed for selection by the mobile user; and
a step of updating the weight coefficient for the plurality of driving route candidates in the OD management information database each time a driving route candidate is selected as an actual driving route by the mobile user.

16. The non-transitory memory medium according to claim 15, further comprising a step of executing a route guidance using the driving route candidate that was selected by the mobile user from among the plurality of driving route candidates displayed in the recommendation order.

* * * * *